United States Patent [19]

Wilhelm et al.

[11] Patent Number: 4,943,915
[45] Date of Patent: Jul. 24, 1990

[54] APPARATUS AND METHOD FOR SYNCHRONIZATION OF A COPROCESSOR UNIT IN A PIPELINED CENTRAL PROCESSING UNIT

[75] Inventors: Neil C. Wilhelm, Menlo Park, Calif.; Judson S. Leonard, Waban, Mass.

[73] Assignee: Digital Equipment Corporation, Maynard, Mass.

[21] Appl. No.: 101,984

[22] Filed: Sep. 29, 1987

[51] Int. Cl.$^5$ .............................................. G06F 15/16
[52] U.S. Cl. .................................. 364/200; 364/228.6; 364/931.49; 364/900
[58] Field of Search ... 364/200 MS File, 900 MS File, 364/748

[56] References Cited

U.S. PATENT DOCUMENTS

| | | | |
|---|---|---|---|
| 3,787,673 | 1/1974 | Watson et al. | 235/156 |
| 4,104,720 | 8/1978 | Gruner | 364/200 |
| 4,128,876 | 12/1978 | Ames et al. | 364/200 |
| 4,149,243 | 4/1979 | Wallis | 364/200 |
| 4,249,248 | 2/1981 | Yomogida et al. | 364/900 |
| 4,438,488 | 3/1984 | Shibayama et al. | 364/200 |
| 4,449,196 | 5/1984 | Pritchard | 364/768 |
| 4,530,050 | 7/1985 | Fukunaga et al. | 364/200 |
| 4,594,655 | 6/1986 | Hao et al. | 364/200 |
| 4,648,034 | 3/1987 | Heninger | 364/200 |
| 4,763,242 | 8/1988 | Lee et al. | 364/200 |
| 4,777,613 | 10/1988 | Shahan et al. | 364/200 |

Primary Examiner—Gareth D. Shaw
Assistant Examiner—Gopal C. Ray
Attorney, Agent, or Firm—William W. Holloway; Michael A. Glenn

[57] ABSTRACT

In a data processing system with a central processing unit having a pipelined mode of operation, apparatus and method are disclosed for synchronizing the operation of a coprocessor unit with the remainder of the central processing unit, the remainder of the central processing unit being implemented for pipelined execution of instructions. Because the coprocessor unit performs manipulations of logic signal groups that require a longer time for execution than the manipulation contemplated by the requirements of pipelined instruction execution, the coprocessor unit must be synchronized with an instruction stream adapted to use the rigidly controlled pipelined implementation. In order to synchronize the coprocessor unit with the remainder of the central processing unit, the instructions controlling the operation of the coprocessor unit have two portions. A first portion of a coprocessor instruction designates the storage location into which the result of the previous operation is to be stored, while the second portion of the coprocessor instruction defines the operation to be performed on the operand in a designated location.

21 Claims, 6 Drawing Sheets

RC:=RA,RB (<RESULT>, <FUNC>, <OP>)
RC:=RA,RB (<RESULT>, <MISC>)
FIG. 5A.
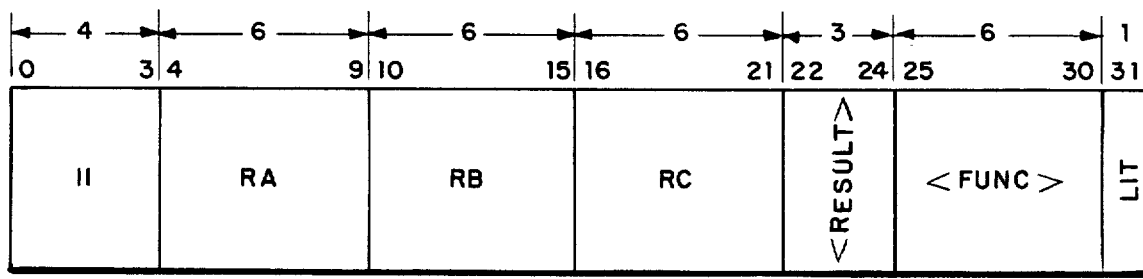
FIG. 5B.
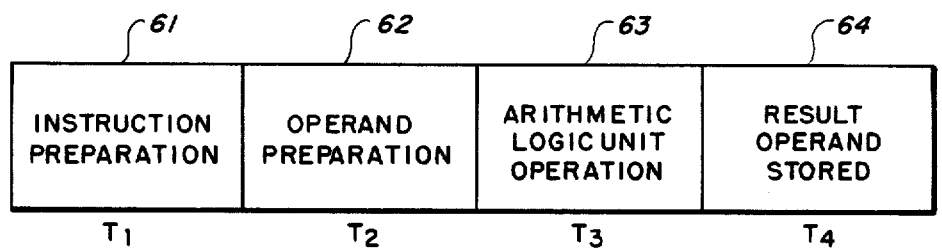
FIG. 6A.
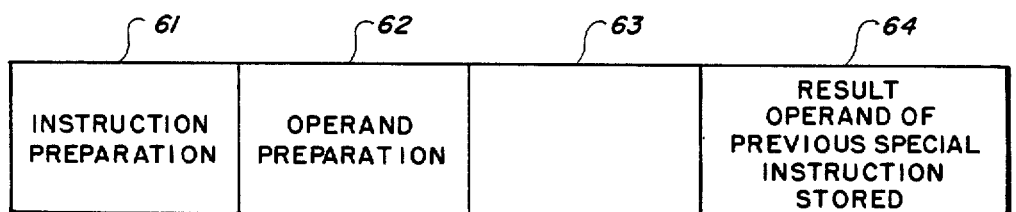
FIG. 6B.

APPARATUS AND METHOD FOR SYNCHRONIZATION OF A COPROCESSOR UNIT IN A PIPELINED CENTRAL PROCESSING UNIT

RELATED PATENTS

The following U.S. Patents are related documents to the instant Application:

PIPELINED HIGH SPEED ARITHMETIC UNIT, invented by William J. Watson et al., having U.S. Pat. No. 3,787,673, issued on Jan. 22, 1974.

CPU/PARALLEL PROCESSOR INTERFACE WITH MICROCODE EXTENSION, invented by Ronald Hans Gruner, having U.S. Pat. No. 4,104,720, issued on Aug. 1, 1978.

SYNCHRONOUS MICROCODE GENERATED INTERFACE FOR SYSTEM OF MICROCODED DATA PROCESSORS, invented by Richard N. Ames et al., having U.S. Pat. No. 4,128,876, issued Dec. 5, 1978.

DISTRIBUTED CONTROL ARCHITECTURE WITH POST AND WAIT LOGIC, invented by Donald E. Wallis, having U.S. Pat. No. 4,149,243, issued Apr. 10, 1979.

PROGRAMMABLE SEQUENCE CONTROLLER WITH AN ARITHMETIC OPERATION FUNCTION, invented by Toshihiko Yomogida et al., having U.S. Pat. No. 4,249,248, issued Feb. 3, 1981.

DATA PROCESSING SYSTEM WITH A SLAVE COMPUTER USING DATA REGISTERS AS THE SOLE OPERAND STORE, invented by Shigeki Shibayama et al, having U.S. Pat. No. 4,438,488, issued Mar. 20, 1984.

DATA PROCESSING SYSTEM FOR MULTI-PRECISION ARITHMETIC, invented by Eric K. Pritchard, having U.S. Pat. No. 4,449,196, issued May 15, 1984.

APPARATUS AND METHOD FOR A CENTRAL PROCESSING UNIT OF A DATA PROCESSING SYSTEM, invented by Neil C. Wilhelm and Judson S. Leonard, having U.S. Ser. No. 07/101,983, filed on Sept. 29, 1987, and assigned to the assignee of the present application.

BACKGROUND OF THE INVENTION

1. Field of the Invention

This invention relates generally to data processing systems, and more particularly, to data processing systems having a central processing unit generally adapted for pipelined execution of instructions. The central processing unit contemplated herein includes a coprocessor unit for performing operations, such as floating point operations, that require an interval time which is longer than the unit of time for which the remainder of the (pipelined) central processing unit has been designed. The operations performed by the coprocessor unit must be synchronized with the remainder of the central processing unit.

2. Description of the Related Art

In order to increase the speed of execution of instructions by a central processing unit, the technique of pipelining the instruction execution has been adapted. In this technique, as illustrated in the example of FIG. 1A and FIG. 1B, the execution of an instruction I, typically requiring a time T for execution, is divided into a plurality of operations, A, B, C, and D. The central processor is partitioned in such a manner that each operation of the instruction is completed in a predefined time period $T_0$. The result of this partitioning (generally referred to as a four stage pipeline in the present example) is that, as illustrated in FIG. 1A, the instruction that required a time T for execution, now requires a time $4T_0$ for instruction execution. Because of the added apparatus required for the partitioning of the central processing unit, the time T for execution of an instruction is typically longer than the execution of the instruction in a non-pipelined central processing unit. Because the time period $T_0$ for each operation is shorter than the length of time T for the execution of the instruction 1, and as a result of the partitioning of the central processing unit for apparatus separately executing each operation of the instruction, an instruction can be initiated in the central processing unit after a time period $T_0$ rather than after a time period T as in the non-pipelined mode of operation. Similarly, an instruction can be completed after each $T_0$ time period in the pipelined mode of operation. Therefore, execution of instruction sequence in the pipelined mode of operation can be expedited even though the execution of each individual instruction requires a longer period of time. As will be clear, the interval $T_0$ is chosen as small as possible consistent with the number of stages in the pipelined execution unit and the most time consuming operation in the partitioned group of instructions.

In the central processing unit, several types of special instructions require more complex processing than is required in the normal processing of logic signal groups through the central processing unit pipeline. A first instruction type involves quantities that are represented by two of the standard logic signal groups, generally referred to as double precision logic signal groups. The use of double precision logic signal groups permits greater accuracy in the representation of a number. A second type of instruction that requires more complex processing involves the floating point representations of numbers. In the floating point representation, a number is represented by a fraction logic signal group and by an exponent argument logic signal group. The exponent argument logic signal group represents the power to which the base exponent is raised while the fraction logic signal group represents a multiplier of the exponential quantity. The floating point number is normalized when not being processed, normalization meaning that a logic "1" signal is entered in the most significant fraction logic signal group position and the exponent argument logic signal group is adjusted accordingly. A third type of instruction that requires special processing includes integer multiplication and integer division. Both the integer multiplication and the integer division instructions require multiple steps and cannot be accommodated within a single timing cycle available for operation in a pipelined central processing unit of a data processing system. In these examples of special types of instructions requiring complex processing of the associated signal groups, the result is that the operation implementing actual data signal group manipulation will require a longer time period than the predefined period of time allotted for each instruction operation by the pipelined central processing unit. By way of example, the addition or subtraction of floating point quantities requires a comparison of the exponent argument quantities and, in the case where equality is not present, an adjustment of the exponent argument logic signal group along with the associated fraction logic signal group before the actual subtraction of the fractions can be performed. Thus, the processing of floating point quantities and double precision quantities cannot be performed in the predefined operation time ($T_0$) of the other stages of the central processing unit.

In order to accommodate the relatively slow execution of these special instructions, the interval for execution of the operations of the pipelined instruction can be chosen to accommodate this relatively lengthy interval required for operation execution. As an example, a double precision floating point division operation can occupy 58 time intervals of an associated pipelined central processing unit in the preferred embodiment. This technique for the accommodation of the relatively slow operation execution speed of the special instructions by lengthening the predefined interval available at each central processing unit pipeline stage provides an unacceptably large negative impact on the execution speed of the instruction sequence.

Similarly, the central processing unit can be adapted to halt operation in response to the presence of an operation execution by the special instructions. This interruption can also impact the speed of execution of an instruction sequence, particularly when a substantial portion of the instructions involve the special operations.

Because the special instructions cannot be accommodated in the main data processing sequence apparatus, the operations on the data signal groups specified by the instructions are performed in central processing unit subsystem, generally referred to as the coprocessor unit, operating in parallel with the main instruction sequence apparatus. The operation of the coprocessor unit is subject to the restriction that the operation must be compatible with the operation of the remainder of the central processing unit.

A need has therefore been felt for apparatus and method for accommodation of relatively long time interval required for the execution of special instructions by a coprocessor unit while retaining the advantages of the pipelined mode of operation.

FEATURES OF THE INVENTION

It is an object of the present invention to provide an improved data processing system.

It is a feature of the present invention to provide a central processing unit having a pipelined mode of operation in which the coprocessor unit is synchronized with the remainder of the central processing unit.

It is yet another feature of the present invention to provide a central processing unit having a pipelined mode of operation in which operations requiring an interval longer than the basic interval of the operation pipeline can be performed without substantial impact on the performance of the central processing system.

It is a more particular feature of the present invention to provide an instruction that identifies a location into which the result of a previous instruction requiring execution by the coprocessor unit is to be stored, the instruction also determining a next activity involving the coprocessor unit.

It is a still further feature of the present invention to provide a pipelined central processing unit in which the coprocessor unit can operate in parallel with the arithmetic logic unit used in the normal instruction execution.

SUMMARY OF THE INVENTION

The aforementioned and other features are accomplished, according to the present invention, by providing a pipelined central processing unit with an arithmetic logic unit for execution of general instructions and with a coprocessor unit for execution of special instructions, special instructions being those instructions that cannot be executed in the pipeline stage time interval provided for typical instruction execution by the central processing unit. To accommodate the longer period of time required for execution of an operation by the special instructions, the special instructions cause the operand resulting from the operation of the coprocessor unit to be stored in a location determined by one of the fields of the instruction. The special instructions determine an activity of the coprocessor unit with an operand stored in two locations in the central processing unit. This activity can be the storage of an operand (stored in two locations of the central processing unit memory defined by fields of the instruction) in the coprocessor unit or can be an operation involving an operand stored in the coprocessor unit and an operand (stored in two locations and defined by fields of the instruction).

These and other features of the present invention will be understood by reading the following description along with the accompanying Figures.

BRIEF DESCRIPTION OF THE DRAWINGS

FIG. 1A illustrates the division of an instruction into a plurality of operations, while

FIG. 3A illustrates the partitioning of a first portion of the central processing unit to provide a four stage pipelined mode of operation according to the preferred embodiment, while

FIG. 4A illustrates the first portion of the pipelined central processing unit having a coprocessor unit coupled thereto, while

FIG. 5A shows the instruction format used in conjunction with the coprocessor operations according to the preferred embodiment, while FIG. 5B illustrates the bit positions assigned to the instructions used in conjunction with the coprocessor operations according to the present invention.

FIG. 6A illustrates the operation of the central processing unit for an instruction not involving the coprocessor, while FIG. 6B illustrates the operation of the central processing unit for an instruction involving the coprocessor.

DESCRIPTION OF THE PREFERRED EMBODIMENT

1. Detailed Description of the Figures

Figure 1A:
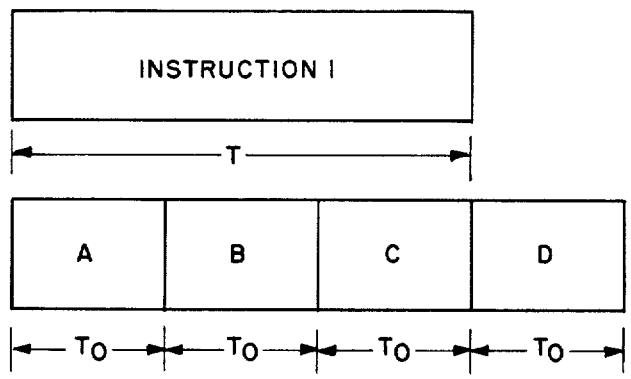
Figure 1B:
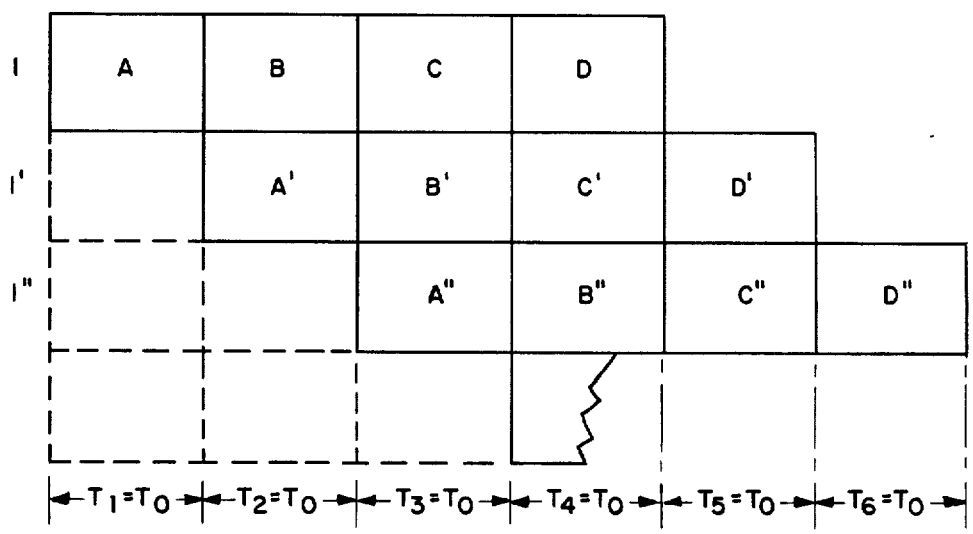
FIG. 1B illustrates the advantages of pipelined execution of instructions.

FIG. 1A and FIG. 1B have been described with reference to the related art.

Figure 2:
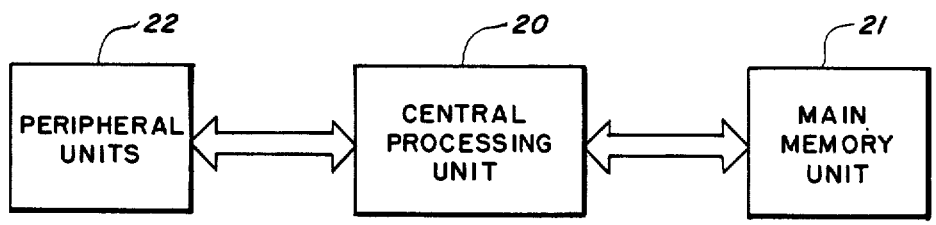
FIG. 2 is a block diagram of the typical organization of a data processing unit.

Referring next to FIG. 2, a general block diagram of a data processing system is shown. The data processing unit includes a central processing unit 20 in which the manipulation and interpretation of the logic signal groups takes place. The logic signal groups processed by the central processing unit 20 are typically stored in the main memory unit 21. The peripheral units 22 include those units required for mass storage of logic signal groups, for communication with the data processing system by other data processing systems or interaction with an operator. The data processing system represented by FIG. 2 can have a wide variety of implementations, for example the central processing unit 20, the main memory unit 21 and the peripheral unit 22 can be coupled by a system bus. FIG. 2 is not intended to include any implementation. The present invention is concerned with the operation of the central processing unit 20 and the interaction with other components will not be developed.

Figure 3A:
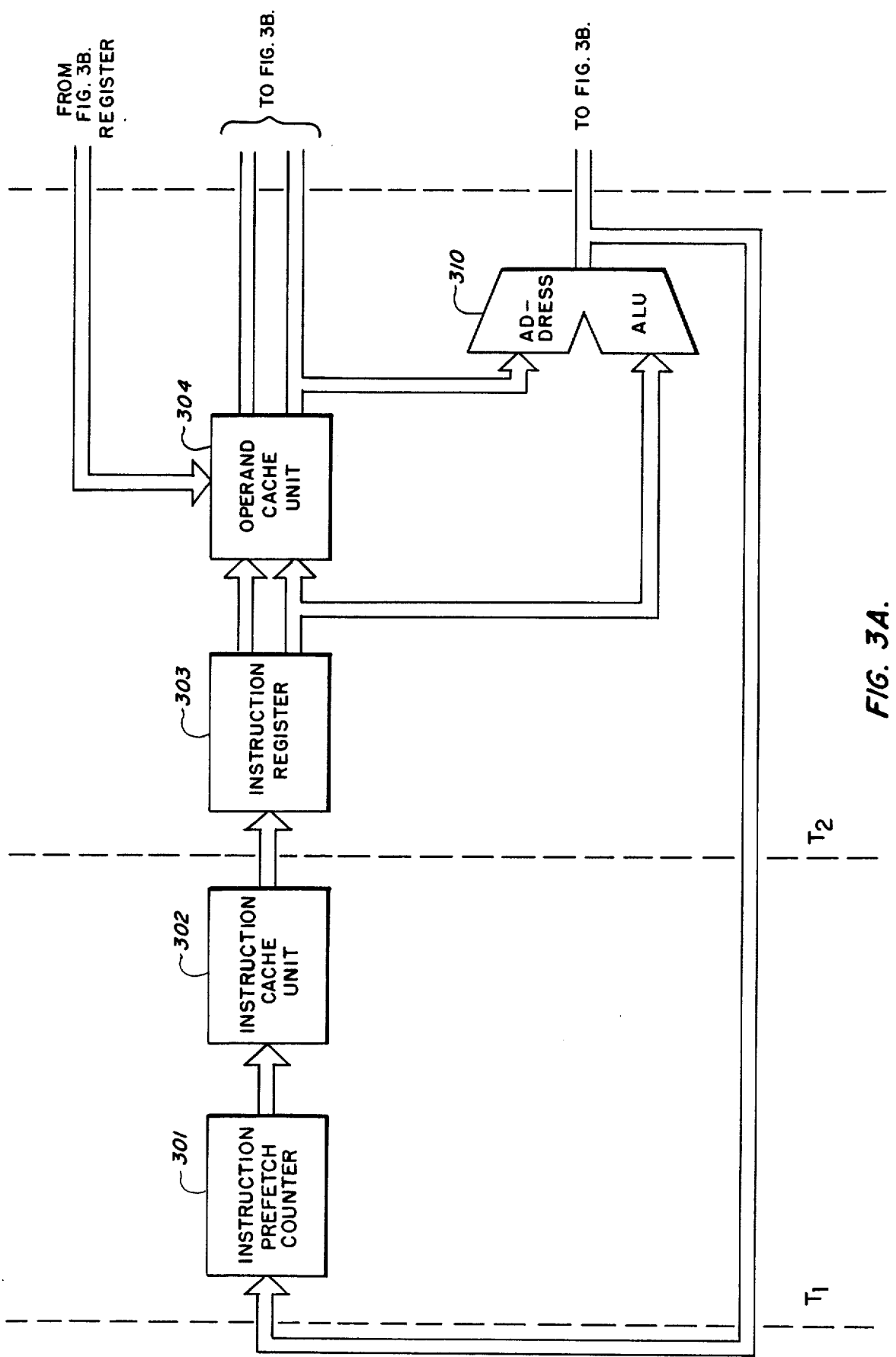
Figure 3B:
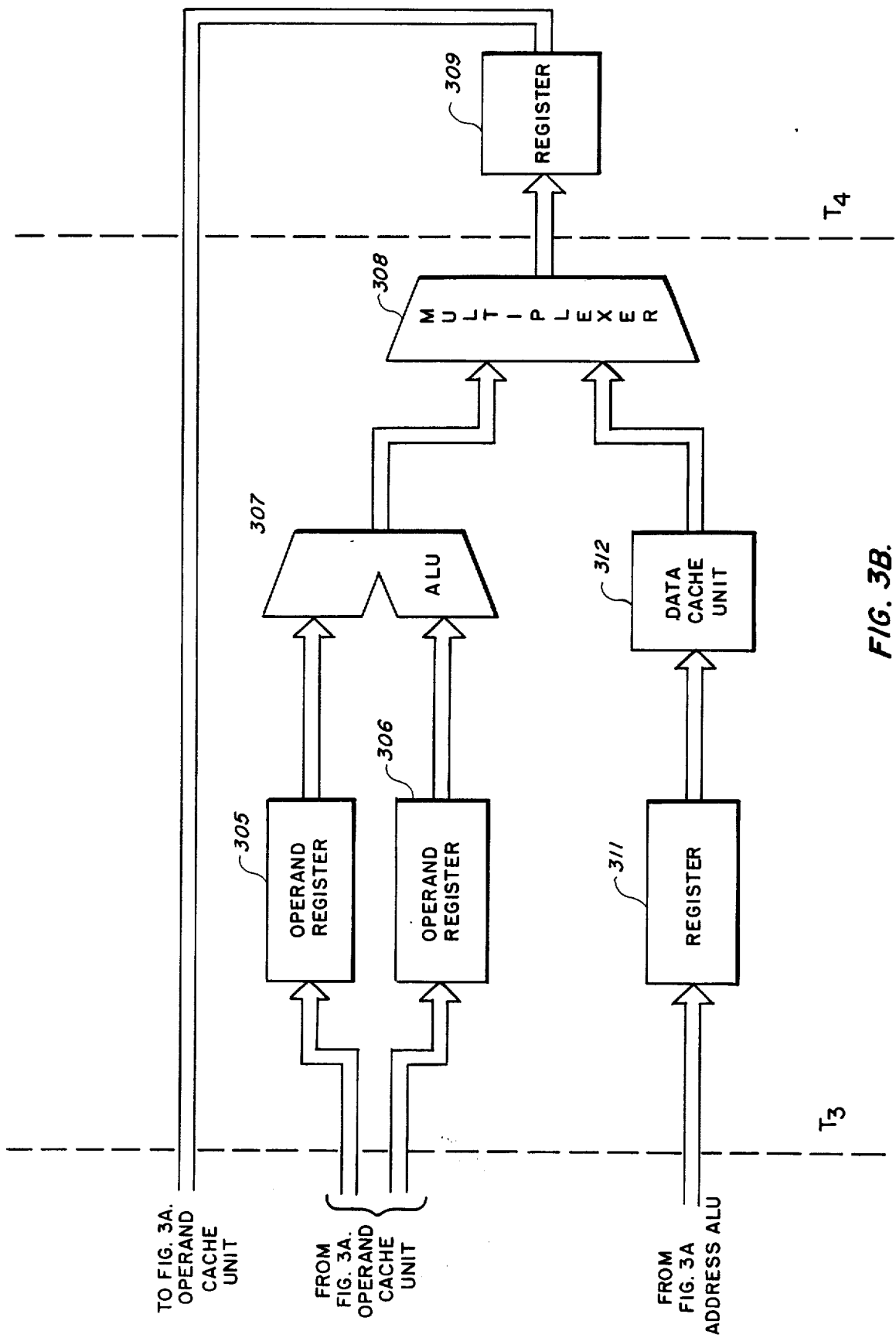
FIG. 3B illustrates the partitioning of a second portion of the central processing unit to provide a four stage pipelined mode of operation according to the preferred embodiment.

Referring next to FIG. 3A and FIG. 3B, a block diagram of the central processing unit configured to operate as a four stage pipeline is illustrated. During the time Period $T_1$, the next instruction to be executed is addressed in the instruction cache unit 302 by instruction prefetch counter 301 and applied to instruction register 303 in the second stage of the pipeline central processing unit. During time period $T_2$, the contents of instruction register 303 are applied to operand cache unit 304 and to an address arithmetic logic unit 310. The contents of the operand cache unit 304, in response to the instruction register 303 signals applied thereto, are applied to operand registers 305 and 306 and to the address arithmetic logic unit 310. Output signals from the address arithmetic logic unit 310 are applied to register 311 and are applied to instruction prefetch counter 301. The path from the address arithmetic logic unit 310 to instruction prefetch unit counter 301 provides for a program branch routine by the central processing unit. During the time period $T_3$, the logic signals from operand registers 305 and 306 are applied to arithmetic logic unit 307 and the signals from register 311 are applied to data cache unit 312. Output signals from the arithmetic logic unit 307 and from data cache unit 312 are applied to multiplexor 308. During time period $T_3$, the output signals are applied from the multiplexor unit 308 to register 309. During time $T_4$ the signals stored in register 309 are distributed to the appropriate memory locations in the central processing unit. As will be clear to those skilled in the art, the control signal paths, resulting from the decoding of the instructions, along with many other signal paths are not indicated in FIG. 3.

Figure 4A:
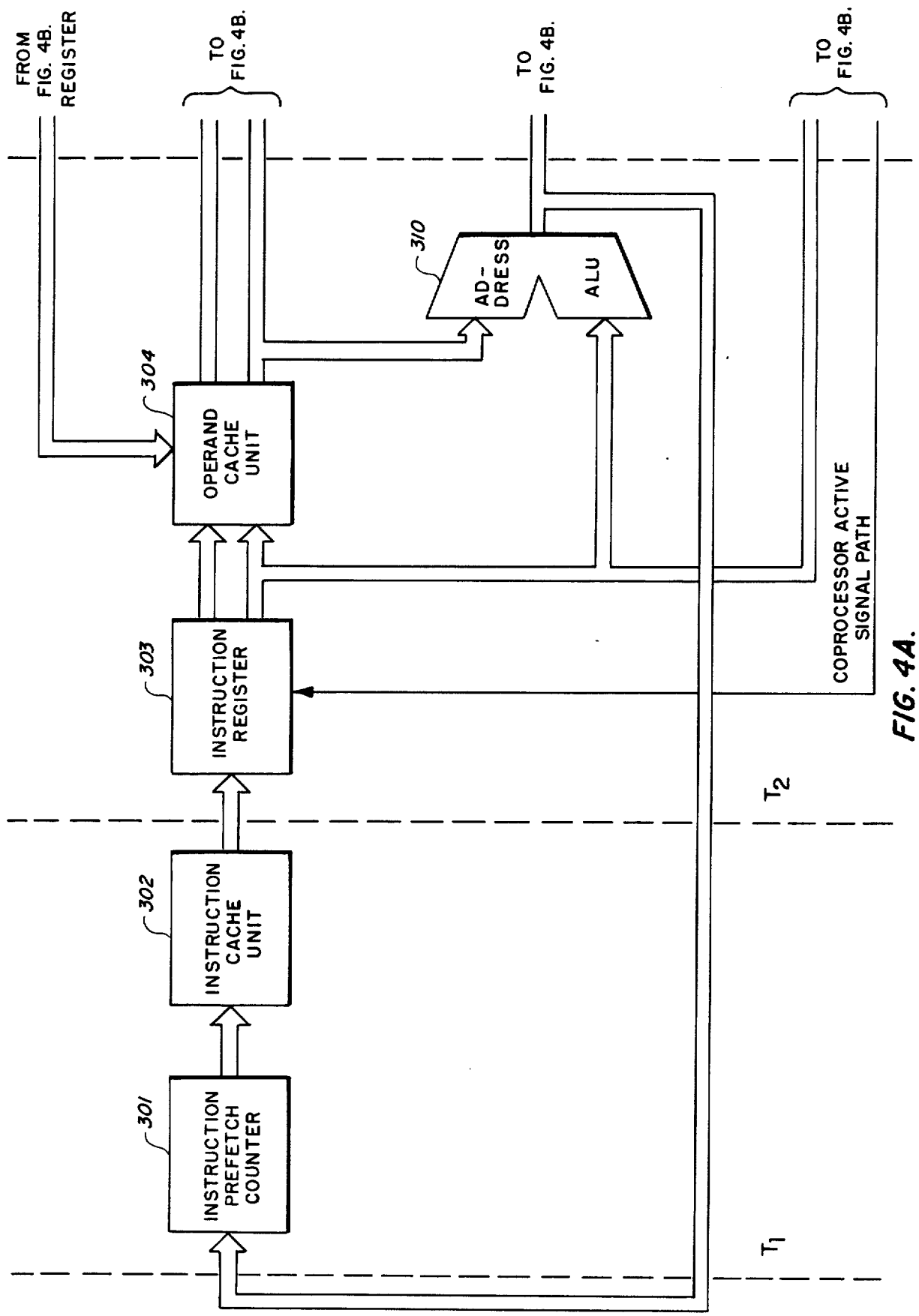
Figure 4B:
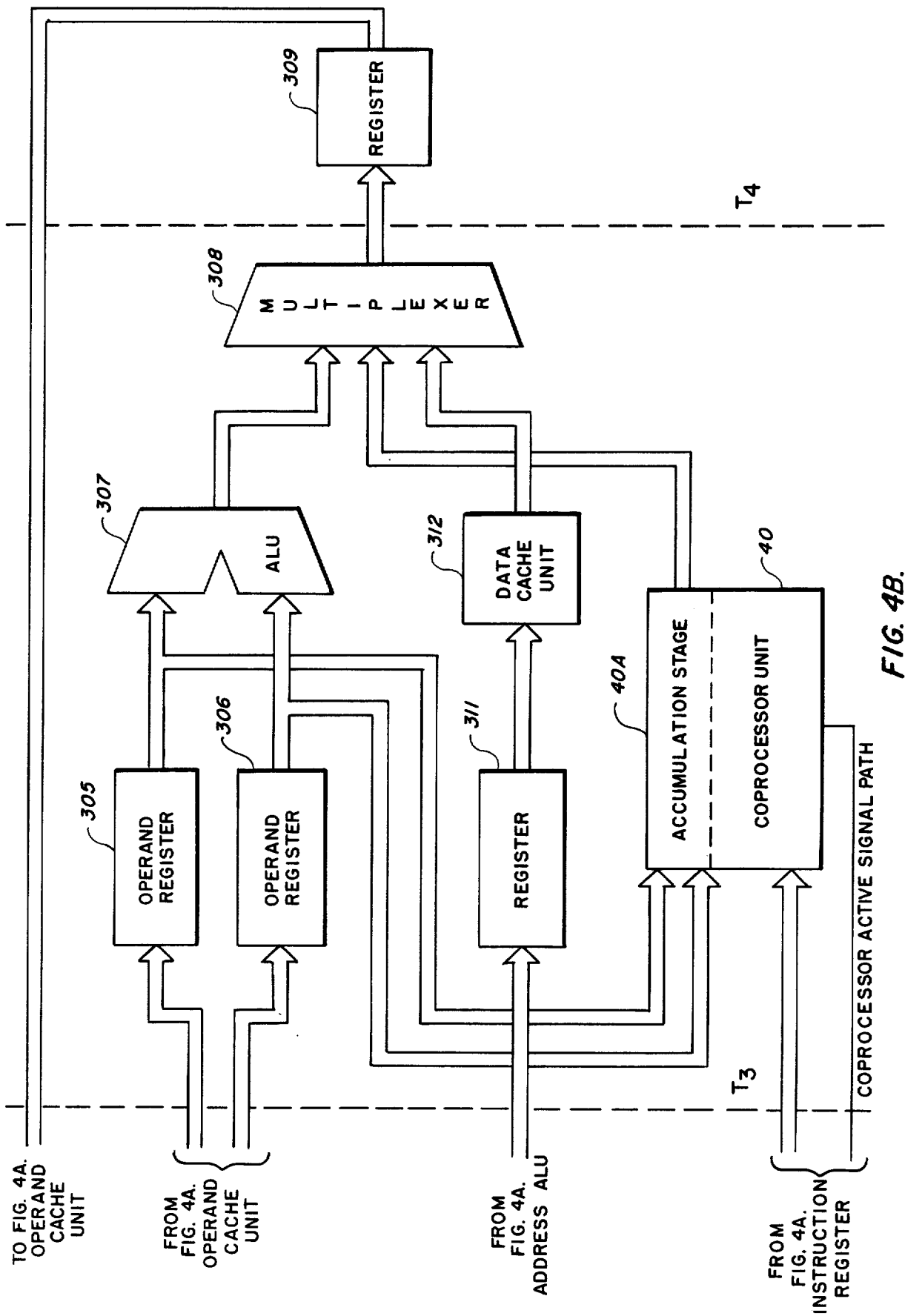
FIG. 4B illustrates the second portion of the pipelined central processing unit having a coprocessor unit coupled thereto.

Referring next to FIG. 4A and FIG. 4B, the coupling of the coprocessor unit 40 to the remainder of the central processing unit is shown. The coprocessor unit 40 is adapted to begin operation in the $T_3$ time interval of the central processor pipeline organization, the interval in the instruction that would normally be devoted to the operation of the arithmetic logic unit 307 for a non-special instruction. The coprocessor unit 40 receives signals from the instruction register 303 defining the activity to be performed and receives signals from the operand registers 305 and 306. The coprocessor unit 40 typically includes an accumulator stage 40A in which signal groups processed by the coprocessor unit 40 are stored. A result operand developed by the coprocessor unit 40 and stored in the accumulator stage is applied to multiplexer unit 308 in response to a next special instruction. A signal path extends from coprocessor unit 40 to instruction register 303. The signal on this signal path indicates that the coprocessor unit is busy, i.e. has not finished performing the calculation indicated by the previous special instruction.

Referring next to FIG. 5A and FIG. 5B, the structure of a special instruction involving the coprocessor unit, according to the preferred embodiment, is shown. The special instruction includes 32 bits. The first four bits, 0–3, provide the operations code (op code) which identifies to the central processing unit that this instruction relates to activity involving the coprocessor unit. The next three fields of 6 bits each provide an address within the central processing unit. The first two of these address fields, RA and RB, define operand locations to be processed by the coprocessor unit. The third address field defines the memory location into which the result operand from the coprocessor unit is stored. The next three bits, bit 22 through bit 24, define the format of the result operand. Bits 25–30 identify the format and the operation to be performed by the coprocessor unit. With respect to the format field, for example, the contents of the memory location RA and RB can be identified as two portions of a fraction field (in which the exponent is not affected by the instruction). With respect to the function field, the operations include addition, subtraction, reverse subtraction, multiplication, division and reverse division. The miscellaneous portion of the instruction, shown in FIG. 5A, which includes several specialized operations to be performed by the coprocessor unit on the two identified operands (i.e., in RA location and the R8 location), or which in some instances involves the value in the coprocessor accumulator stage. As is typical, the format for the special instructions is similar to the format of the remaining instructions of the instruction set, the difference being in the interpretation of the various instruction fields.

Referring next to FIG. 6A, the execution of a standard (non-coprocessor unit) instruction is summarized with respect to FIG. 3. During the first time interval, $T_1$, the instruction to be executed is retrieved in preparation for execution. During the second time interval, $T_2$, the instruction is used to retrieve the operands to be processed by the central processing unit. During the third interval, $T_3$, the operands, retrieved in the previous time period, are processed by the arithmetic logic unit and applied to a temporary register. And during the fourth interval, $T_4$, the resulting operand is stored. In FIG. 6B, the execution of a special instruction, involving the coprocessor unit, is summarized. In the time intervals $T_1$ and $T_2$, the operation of the central processing unit is similar to the execution of a standard instruction. In time interval $T_3$, however, the operation of the central processing unit is different. The result of the operation of the coprocessor unit defined by the previous special instruction is stored in a temporary register. The contents of the two operand registers are applied to the coprocessor unit and the activity defined by the instruction is initiated. In time interval $T_4$, the result operand is stored in the central processing location defined by the RC field of the instruction. Because the coprocessor unit is not in the principal (or normal) data path, other standard instructions can be executed while the coprocessor unit is performing the operation defined by the instruction.

2. Operation of the Preferred Embodiment

The invention provides an instruction and apparatus implementing the instruction that permits efficient incorporation of the coprocessor into a central processing unit that has a pipeline structure. In essence, the instruction defines an operation involving the coprocessor while designating where the results of a previous coprocessor operation are to be transferred The instruction indicates an operation that cannot be executed in the normal timing cycle of the pipeline stages and must therefore be executed out of the ordinary pipeline sequence. Integer multiplication and integer division as well as operations involving special data formats are examples of activity that must be performed outside the normal central processing unit pipeline. It will be clear to those skilled in the art that, although the present invention has been described with reference to a four deep pipeline of the central processing unit pipeline, the technique can be applied to a pipeline having any number of stages.

In the preferred embodiment, the results of the coprocessor unit are stored (in the accumulator stage) until the next special instruction is executed. When, the central processing unit attempts to execute a special instruction before the results of the coprocessor are available, the operation of the central processing unit is halted until the coprocessor unit has completed the designated operation. The availability of the coprocessor unit results is transmitted to the instruction register by the signal path therebetween indicating that the coprocessor is no longer active. Then the operation of the central processing unit is continued.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the present invention.

What is claimed is:

1. A pipelined central processing unit capable of executing a first set of instructions and a plurality of special instructions, said central processing unit comprising:
   an instruction cache memory unit for storing instructions to be executed;
   an instruction register for processing an executing instruction from said instruction cache memory unit, said executing instruction being a next instruction to be executed by said central processing unit, said instruction register including means for determining when an executing instruction is a special instruction;
   an operand cache memory unit for storing operands to be processed;
   at least one operand register for storing an operand to be processed in response to said executing instruction, wherein said operand to be processed is transferred from said operand cache memory unit to said operand register in response to said executing instruction;
   an arithmetic logic unit coupled to said instruction register and to said operand register for performing an operation on said operand to be processed in a manner determined by said executing instruction when said executing instruction is selected from said first set of instructions;
   a coprocessor unit coupled to said instruction register and to said operand register for performing an operation on said operand to be processed in a manner determined by said executing instruction when said executing instruction is a one of said special instructions;
   storage means coupled to said coprocessor unit for storing a resulting operand provided by said coprocessor unit;
   first means coupled to said storage means and responsive to a presence of said resulting operand stored in said storage means for applying a first signal to said instruction register; and
   second means coupled to said instruction register and responsive to said first signal for preventing processing of an executing instruction when said executing instruction is a special instruction until said first signal is present.

2. The pipelined central processing unit of claim 1 wherein said executing instruction is processed in a manner determined by said executing instruction when said first signal is applied to said second means and said executing instruction is an instruction selected from said first set of instructions.

3. The pipelined central processing unit of claim 2 wherein an operand to be processed is stored in two locations of said operand cache memory unit and an associated executing special instruction performs an operation selected from the group consisting of a floating point operation and a double precision operation.

4. The pipelined central processing unit of claim 1 wherein said coprocessor unit executes a one of said special instructions providing an arithmetic operation involving operands and a quantity stored in said coprocessor unit.

5. The pipelined central processing unit of claim 1 wherein said coprocessor unit executes a special instruction resulting in an operation selected from a group consisting of an integer multiplication operation, integer division operation, a floating point processing operation, and a double precision operation operation.

6. The pipelined central processing unit of claim 1 wherein said storage means is an accumulator register, said second means preventing processing activity by said coprocessor unit when said resulting operand resulting from a previous sequential special instruction is not stored in said accumulator register.

7. The pipelined central processing unit of claim 1 wherein said operand cache memory unit is coupled to said instruction register and said operand register, said operand cache memory unit and said instruction register forming a pipeline stage of said pipelined central processing unit.

8. The pipelined central processing unit of claim 7 wherein a resulting operand stored in said coprocessor unit, provided as a result of a first special instruction being an executing instruction, is stored in said operand cache unit at a location determined by a next sequential special instruction.

9. The pipelined central processing unit of claim 8 further comprising a multiplexor coupled to said arithmetic logic unit and said coprocessor unit for selecting a resulting operand to be stored in said operand cache memory unit, said resulting operand from said coprocessor unit being stored in said operand cache memory unit when said first signal is present and said executing instruction in said instruction register is a special instruction.

10. A method of executing regular instructions and special instructions in a pipelined central processing unit, said special instructions requiring time intervals greater than a pipeline time interval for a processing operation executed thereby, said method comprising the steps of:

transferring an executing instruction from an instruction cache memory unit to an instruction register, said executing instruction including an address of at least one operand to be processed and an operation code determining an operation to be performed on said at least one operand to be processed, said instruction further including an address for a resulting operand resulting from said operation to be performed;

processing an executing regular instruction by an arithmetic unit with said operation to performed on said at least one operand to be processed, said at least one operand to be processed having an address included in said executing regular instruction stored in an operand register;

processing an executing special instruction by a coprocessor unit with said operation to be performed on said at least one operand to be processed included in said executing special instruction in said operand register; and storing a resulting operand resulting from said operation to be performed identified in said executing special instruction in an output register of said coprocessor unit, wherein an executing special instruction in said instruction register performs said operation to be performed only when a resulting operand derived from a previous executing special instruction is stored in said output register.

11. The method of executing regular and special instructions of claim 10 further including the step of formatting each special instruction wherein said address for a resulting operand designates an address for a resulting operand currently stored in said output register.

12. The method of executing regular and special instructions of claim 11 further comprising the step of preventing activity in response to an executing special instruction in said instruction register when a resulting operand resulting from a next previous executing special instruction is not stored in said output register.

13. The method of executing regular and special instructions of claim 12 further comprising the step of resuming said activity in response to said executing special instruction in said instruction register when said resulting operand resulting from said next previous executing special instruction is stored in said output register.

14. The method of executing regular and special instructions of claim 13 further comprising the step selected from the group of steps consisting of performing integer multiplication operations, performing integer division operations, performing floating point operations, and performing double precision operations in said coprocessor unit, each of said steps performed in response to an operation code of each special instruction.

15. A pipelined central processing unit wherein execution of each instruction is partitioned into a plurality of operations, each operation capable of being completed within a predetermined time interval, said central processing unit comprising:

an instruction memory unit; 'an instruction register for distributing signals from an executing instruction, said executing instruction being transferred from said instruction memory unit;
an operand memory unit;
at least one operand register coupled to said operand memory unit for receiving operands from said operand memory unit in response to initial operand address signals in said executing instruction;
an arithmetic logic unit coupled to said instruction register and said operand register for performing processing operations on initial operands stored in said operand register in response to operation code signals from said executing instruction in said instruction register, said processing operations by said arithmetic unit capable of being completed within said predetermined time interval;
a first set of instructions controlling processing operations in said arithmetic unit, each of said first set of instructions having operation code signals and initial operand and resulting operand address signals, said resulting operand address signals being an address in said operand memory unit into which an operand processed by said arithmetic logic unit in response to said executing instruction in said instruction register is stored;
a coprocessor unit coupled to said instruction register and to said operand register for performing processing operations on initial operands stored in said operand register not capable of being completed within said predetermined time interval, said processing operations performed in response to said operation code signals of said executing instruction in said instruction register; and
a second set of instructions controlling processing operations of said coprocessor unit, each of said second set of instructions having operation code signals and initial and resulting operand address signals, wherein said second set instructions resulting operand address signals identify a location in said operand memory unit into which an initial operand processed by said coprocessor unit as a result of a processing operation determined by an operation code of a previous executing instruction in said instruction register is to be stored.

16. The pipelined central processing unit of claim 15 wherein said arithmetic logic unit can process a first set executing instruction in said instruction register while said coprocessor unit is processing a second set executing instruction previously stored in said instruction register.

17. The pipelined central processing unit of claim 16 wherein said coprocessor unit includes an output register, said pipelined central processing unit further comprising a signal means for providing a signal when a resulting operand is stored in said output register, said processing of a second set executing instruction in said instruction register being suspended when a resulting operand from a next previous second set instruction has not been stored in said output register.

18. The pipelined central processing unit of claim 17 wherein operation codes of said second set instructions designate a processing operation for said coprocessor unit selected from the group consisting of an integer division operation, an integer multiplication operation, a floating point operation, and a double precision operation.

19. The pipelined central processing unit of claim 17 wherein second set instruction processing suspended when said resulting operand is not stored in said output register is resumed when a resulting operand is stored in said output register.

20. The pipelined central processing unit of claim 15 wherein said second set instruction address signals can identify locations in said operand memory unit for two initial operands.

21. The pipelined central processing unit of claim 15 wherein said second set of instructions include at least one special instruction, said special instruction transferring an initial operand to said coprocessor unit, said initial operand being stored in two locations of said operand memory unit.

* * * * *